United States Patent
Klaes et al.

(10) Patent No.: US 9,417,042 B2
(45) Date of Patent: Aug. 16, 2016

(54) ARROW WITH EMBEDDED DEPLOYABLE RFID TAG AND THE METHODS OF USING AND TRACKING THE SAME

(75) Inventors: Steven Klaes, Mayville, WI (US); Nicholas A. Brannen, Fond du Lac, WI (US)

(73) Assignee: Personal Data Technics, LLC, Mayville, WI (US)

( * ) Notice: Subject to any disclaimer, the term of this patent is extended or adjusted under 35 U.S.C. 154(b) by 797 days.

(21) Appl. No.: 13/315,607

(22) Filed: Dec. 9, 2011

(65) Prior Publication Data
US 2012/0146770 A1 Jun. 14, 2012

Related U.S. Application Data

(60) Provisional application No. 61/421,983, filed on Dec. 10, 2010.

(51) Int. Cl.
| | |
|---|---|
| *H04Q 5/22* | (2006.01) |
| *F42B 30/00* | (2006.01) |
| *F42B 6/04* | (2006.01) |
| *F42B 12/36* | (2006.01) |
| *G06K 19/077* | (2006.01) |

(52) U.S. Cl.
CPC ............ *F42B 30/006* (2013.01); *F42B 6/04* (2013.01); *F42B 12/365* (2013.01); *G06K 19/07758* (2013.01)

(58) Field of Classification Search
CPC ............ F42B 6/04; F42B 6/08; F42B 12/385; F42B 12/365; F42B 12/40; G06K 7/10366; G06K 7/0008; G06K 19/0723; G06K 7/01; G08B 21/02; G08B 21/06; G08B 23/00; G08B 13/2462; G08B 21/22; G08B 21/18; G06F 19/3418; H04W 4/02

USPC ............ 340/10.1–10.6, 539.13, 572.1–572.9, 340/573.1–573.4, 568.6, 686.1; 473/158, 473/570, 578, 582, 583
See application file for complete search history.

(56) References Cited

U.S. PATENT DOCUMENTS

| | | | | |
|---|---|---|---|---|
| 4,858,935 A * | 8/1989 | Capson | ................. | F42B 12/385 473/570 |
| 4,940,245 A | 7/1990 | Bittle, Jr. | | |
| 6,317,030 B1 | 11/2001 | Magee | | |
| 6,409,617 B1 * | 6/2002 | Armold | ................. | F42B 12/385 455/98 |
| 8,075,430 B1 * | 12/2011 | Hester | ................... | F42B 12/385 473/578 |
| 8,192,309 B1 * | 6/2012 | Roberts | ................. | F42B 12/385 473/578 |
| 2005/0231362 A1 * | 10/2005 | Pridmore, Jr. | ........ | F42B 12/385 340/539.32 |
| 2010/0035709 A1 * | 2/2010 | Russell | ................. | F42B 12/385 473/570 |

* cited by examiner

*Primary Examiner* — George Bugg
*Assistant Examiner* — Sharmin Akhter
(74) *Attorney, Agent, or Firm* — Anthony J. Bourget

(57) ABSTRACT

The present invention relates to an arrow with an embedded deployable RFID tag, and to the methods of using the same in order to improve tracking of an animal. In one embodiment, the tracking device has a body that attached intermediate the head and shaft of an arrow. The internal components can compress during impact with a target, allowing an embedded to become embedded within the target. The embedder can utilize an RFID or other electronically trackable device. A safety can further be provided to prevent the deployment of the embedder during target practice. A tracker can be used to track specific tags that are deployed, and in particular, tags that are lodged within an animal. In one additional embodiment, a signal is provided when the RFID tag is deployed.

8 Claims, 6 Drawing Sheets

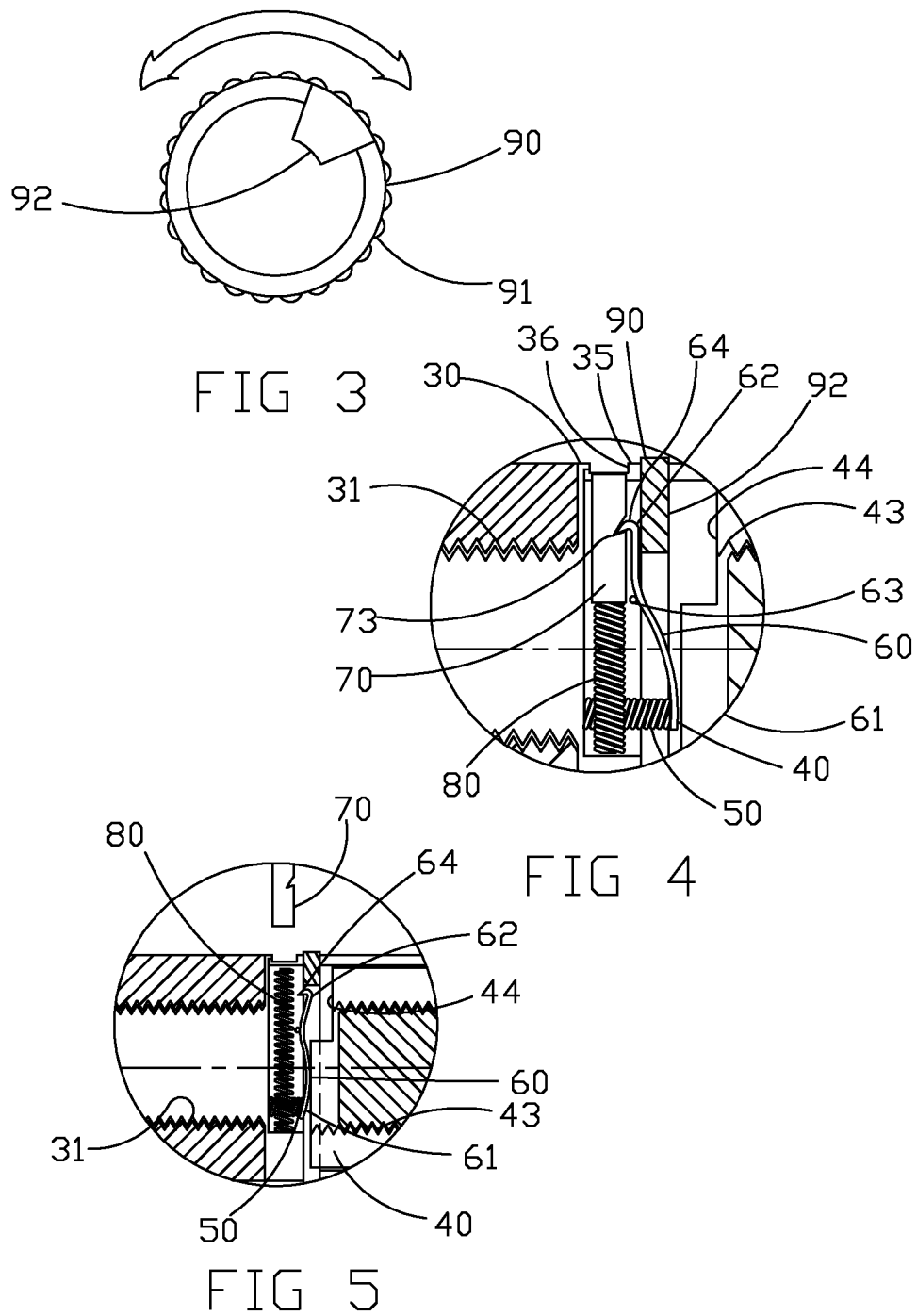

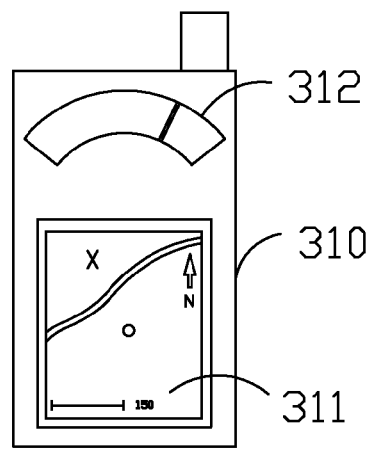
FIG 13
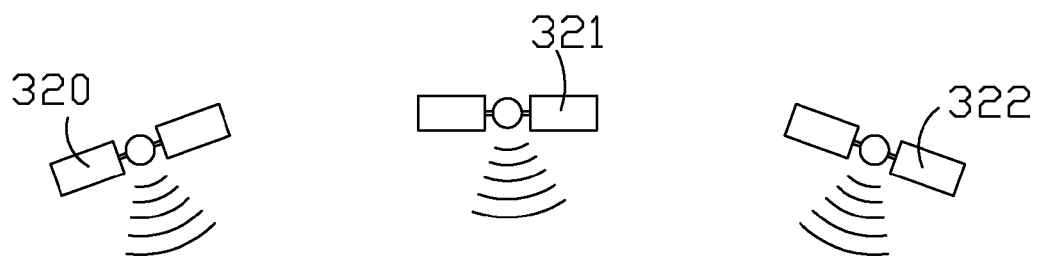
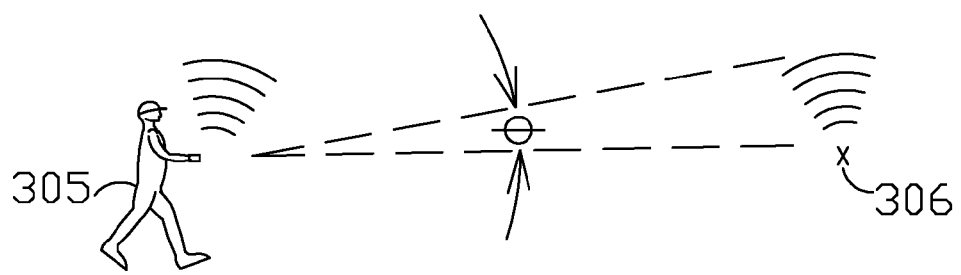
FIG 14

ARROW WITH EMBEDDED DEPLOYABLE RFID TAG AND THE METHODS OF USING AND TRACKING THE SAME

This utility patent application claims priority on and the benefit of provisional application 61/421,983 filed Dec. 10, 2010, the entire contents of which are hereby incorporated herein by reference.

BACKGROUND OF THE INVENTION

1. Field of the Invention

The present invention relates to an arrow with an embedded deployable RFID tag, and to the methods of using and tracking the same in order to improve tracking of an animal.

2. Description of the Related Art

Game tracking is a required hunting skill. Sometimes, the tracking involves visual cues such as spotting blood drops. Yet, if a wound does not bleed out, or only intermittently bleeds out, then the task of tracking utilizing this technique can be quite difficult. To overcome the limitations inherent to tracking a blood trail, several products have been developed. Some examples include:

U.S. Pat. No. 6,317,030 to Magee is titled Method Of and System For Conducting a Hunting Tournament or Contest Utilizing Passive Transponder Identification. As the title suggests, the patent teaches that passive transponders are inserted subcutaneously into the game to be harvested. Tagged animals are released back into their natural habitat. The hunting portion of the tournament is conducted. Animals harvested during the hunting tournament are brought in and scanned. The passive transponder, if present, responds to the scanning by transmitting an identification code. The code transmitted by the passive transponder is used to determine the prize the hunter is awarded. Hunter identification tags can be distributed to all participants in the hunting tournament and be used to tag the harvested animal. The passive transponder can be constructed to respond only to a particular scanning device. While this patent may prove useful for its intended purposes, it does not appear useful in the wild, when game cannot be pre-tagged.

United States published application by Pridmore, Jr. et al., having publication number 2005/0231362 is titled Apparatus Carrying a Mounted RFID Circuit for the Purpose of Deploying and Generating a Tracking Signal (Post Shot Only) From an Arrow. While this publication shows a wire hub, an RFID PCB and a carrier housing, its design can be improved upon.

United States published application by Russell et al., having publication number 2010/0035709 is titled Method for Employing a Tracking Device with an Arrow. This patent teaches a two part arrow employing a tracking device used to track wounded game animals. When the hunting broad head engages a game animal, a separating slide mechanism that encircles the anterior arrow segment slides toward the rear of the arrow catching the lever component of the release mechanism secured inside the posterior arrow segment releasing the broad head and anterior arrow segment from the posterior arrow segment. A retainer housed in the anterior arrow segment springs open and engages the animal. An attachment device connects the retainer to the release mechanism ensuring that the posterior arrow segment and the signaling component located in the posterior arrow segment remain tethered to the animal. A special separating shaft appears to be required for use with this invention. Many hunters have grown accustomed to a particular brand of shaft, and accordingly would be reluctant to utilize a different shaft.

U.S. Pat. No. 4,940,245 to Bittle, Jr. is titled Arrow/Wounded Animal Tracking Device. It illustrates a miniaturized electronic transmitter tracking device for mounting on the shaft of a hunting arrow. An integral membrane or diaphragm attaches the transmitter to the arrow in the preferred embodiment and allows the transmitter to break away from the arrow when the arrow strikes some object. A membrane switch is activated when the face plate of the device impacts the animal. Barbed points are driven into the surface of the struck animal by the force of the impact, thus firmly attaching the device to the object. In its preferred embodiment, the transmitter device is used in conjunction with a base receiver to determine the transmitter's location after the arrow has been fired.

While each of these products may work well for their intended purposes, the each nevertheless could be improved upon.

In particular, these references fail to show a product that can be used in-line with existing products between the head and the shaft.

These references fail to show an RFID tag that is deployable on an embedder. Further, none show an embedder that is released automatically upon the arrow striking the target.

These references fail to show a safety, whereby the arrow can be used in practice without the RFID tag being deployed.

Thus there exists a need for an invention that solves these and other problems.

SUMMARY OF THE INVENTION

The present invention relates to an arrow with an embedded deployable RFID tag, and to the methods of using the same in order to improve tracking of an animal. In one embodiment, the tracking device has a body that attached intermediate the head and shaft of an arrow. The internal components can compress during impact with a target, allowing an embedded to become embedded within the target. The embedder can utilize an RFID or other electronically trackable device. A safety can further be provided to prevent the deployment of the embedder during target practice. A tracker can be used to track specific tags that are deployed, and in particular, tags that are lodged within an animal. In one additional embodiment, a signal is provided when the RFID tag is deployed.

According to one advantage of the present invention, the tracking device can be integrated into existing shaft and head combinations. This advantageously allows the hunter to continue using preferred arrow heads and shafts.

According to another advantage of the present invention, the assembly is has a low profile designed to have a minimal effect on arrow aerodynamics and other flight dynamics.

According to a further advantage of the present invention, the embedder is deployable upon contact with the target. The embedder embeds the RFID tag into the target even when the arrow completely passes through the target.

According to a still further advantage of the present invention, a safety can be incorporated to prevent deployment of the embedder during certain situations, such as during target practice. In this regard, the embedder deploys affirmatively only when desired.

According to a still further advantage yet of the present invention, a hand held unit can be utilized that distinguishes between the signals of different arrows. In this regard, a hunter can effectively track the correct RFID tag, and ignore RFID tags from errant shots other from other hunters.

According to a still further advantage of the present invention, in some embodiments, a signal can be generated upon deployment of the embedder. The signal can be transmitted by any suitable electronic methods, and can include GPS location and date and time information of deployment. The information from the signal can be stored in the handheld tracking unit. The information can then be reviewed at a later time to confirm that the hunter was complying with any and all date, time and any geographic restrictions.

According to a still further advantage of the present invention, the hand held unit can have a display that overlays RFID location data over GPS data. Further, the hand held unit can have a direction indicator to indicate the direction of the RFID tag relative the unit.

Other advantages, benefits, and features of the present invention will become apparent to those skilled in the art upon reading the detailed description of the invention and studying the drawings.

BRIEF DESCRIPTION OF THE DRAWINGS

FIG. 3 is an isolation view of an embodiment of a safety.

FIG. 4 is a close up view of FIG. 1.

FIG. 5 is a close up view of FIG. 2.

FIG. 13 is a view showing the face of a hand held unit of the present invention.

FIG. 14 is a schematic showing the hand held unit being used in an intended environment.

DETAILED DESCRIPTION OF PREFERRED EMBODIMENTS

Figure 1:
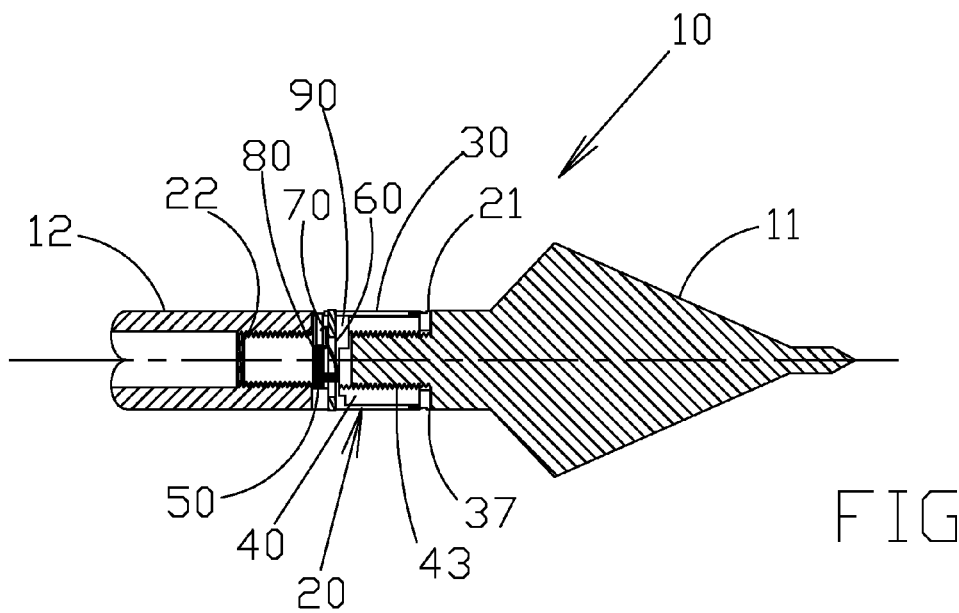
FIG. 1 is a cross-sectional view of a first preferred embodiment of the present invention.
Figure 2:
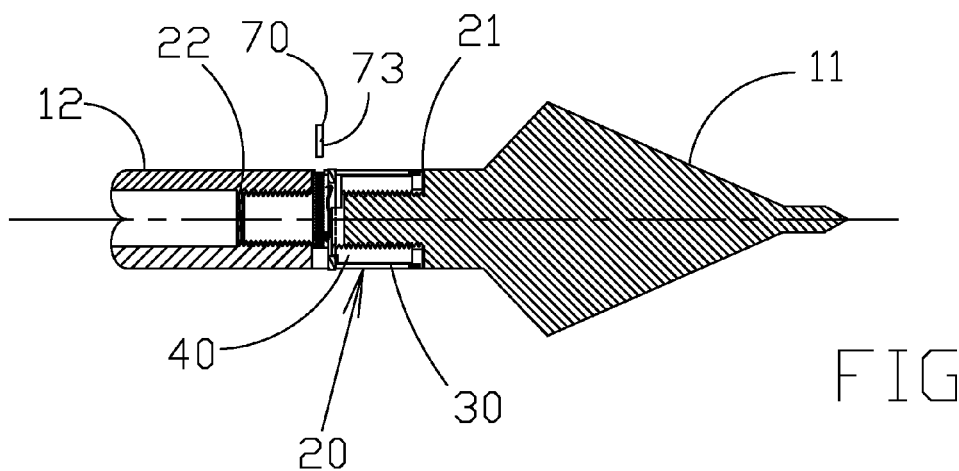
FIG. 2 is similar to FIG. 1, but shows the embedder released from the body.
Figure 6:
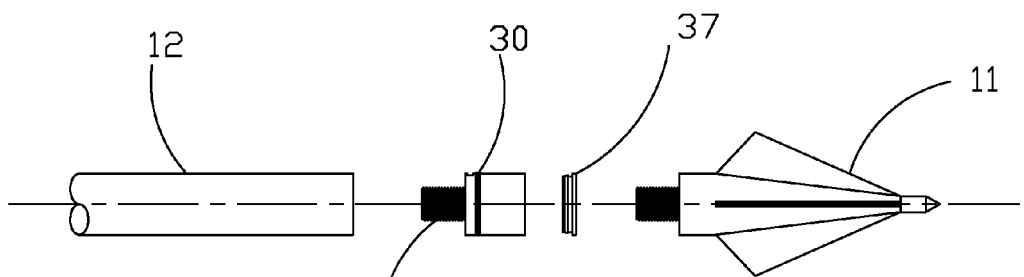
FIG. 6 is an exploded view of the embodiment illustrated in FIG. 1.
Figure 7:
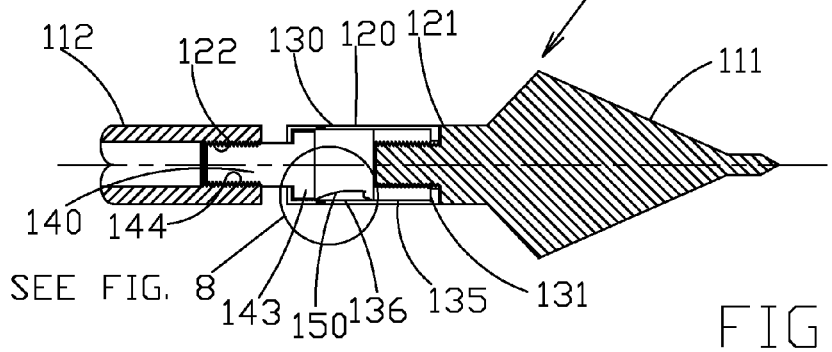
FIG. 7 is a cross-sectional view of an alternative embodiment of the present invention.
Figure 8:
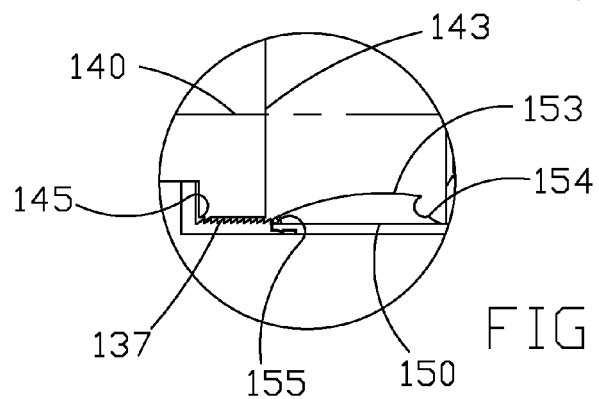
FIG. 8 is a close up view take from FIG. 7.
Figure 9:
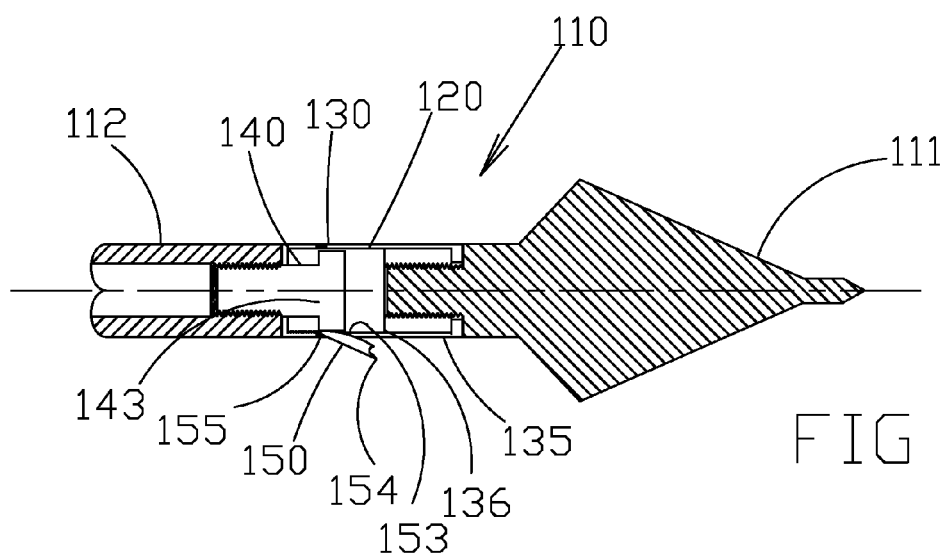
FIG. 9 is a cross-sectional view showing the embedder deployed.
Figure 10:
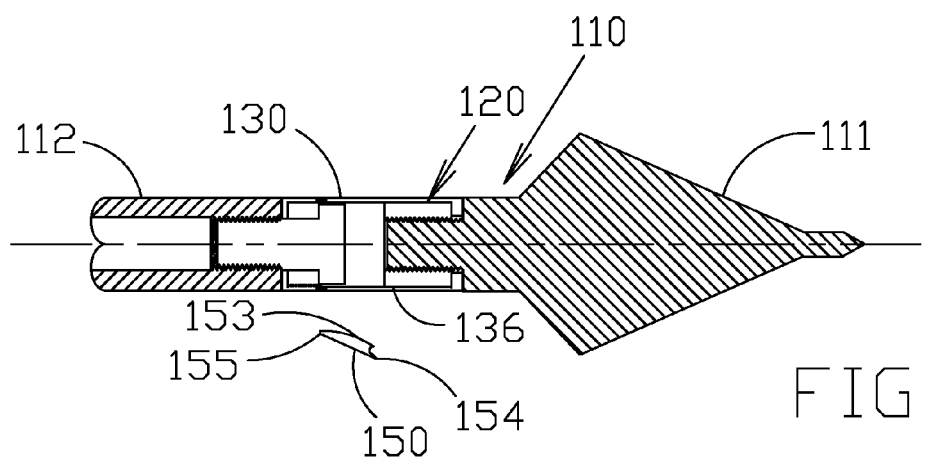
FIG. 10 is a cross-sectional view showing the embedder separated from the body.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Turning first to FIGS. 1-6, it is seen that a first preferred embodiment is illustrated. The arrow 10 generally has a head 11 and a shaft 12, which can be of any standard sizing and brand. Intermediate the head 11 and shaft 12, a tracking assembly 20 can be installed. The tracing assembly 20 has a first end 21 and a second end 22.

A body 30 with a threaded shaft 31, a sidewall 35 and a port 36 is also provided. The port 36 is an opening through the sidewall, and is preferably allows an item to be inserted into and removed from the sidewall in a manner preferably generally perpendicular to the sidewall. A cap 37 is also provided. The cap 37 fits on the sidewall 35 at end 21 of the tracking assembly.

A carriage 40 is housed within the body. The carriage 40 has a first end and a second end, and has a threaded hole 43 at the first end for receiving threaded end of an arrow. A clearance 44, or removed portion, is located at the second end of the carriage to provide a mechanical clearance for other items used during operation.

A base spring 50 is provided. The base spring 50 is intermediate a portion of the body 20 and the second end of the carriage 40. The spring 50 biases the carriage 40 towards the cap 37 at the first end of the body.

A release 60 is further provided, and has ends 61 and 62, a pivot 64 and an engager such as a hook 64. The release is also biased from spring 50 to be against the end of the carriage. When the arrow 10 impacts an object, the carriage 40 will overcome the spring force of spring 50 and slightly separate from the cap 37. This causes the release 60 to pivot around the pivot 63.

An embedder 70 is provided having a notch 73. The embedder 70 preferably has a communication device such as an RFID tag embedded therein. In the preferred embodiment, the RFID tag has a unique identification signal. An embedder spring 80 forces the embedder 70 out of port 36 when the release 60 releases the embedder (because of the motion shift between the carriage and body, described above). The embedder can have a bladed front end that cuts through tissue a selected amount until the embedder 70 loses momentum, at which point it remains lodged within the target.

A safety 90 is further provided. The safety 90 has an annular perimeter 91 and an internal lug 92. The user can engage the safety by rotating the perimeter 91 about a central axis to position the lug 92 in a first position, wherein the hook 64 of the release 60 is prevented from disengaging the notch 73 of the embedder. The user can disengage the safety by rotating the perimeter to position the lug 92 to allow the release to operate normally.

Looking now at FIGS. 13 and 14, it is seen that a hand-held device 310 can be used to track and store information. The device 310 can have a reader that tracks the deployed RFID embedded embedder, and can distinguish from the unique identification signals of multiple RFID tags. In this regard, the hunter can track the intended embedder and ignore others, such as arrows from other users or from arrows that didn't strike the target.

In operation, the user 305 can track the location of a target 306 when the RFID tag is lodged in the target 306. The handheld unit 310 is preferably GPS enabled, and has a display 311 that displays the location of the user 305 by determining from satellites 320, 321 and 322 the location of the unit 310. RFID location data is then overlaid on the display 311 whereby the distance and location between the user and target are displayed on the same screen. The display can have a scale and is preferably oriented to the north at the top side of the display. A direction indicator 312 is also provided. The user can determine the relative direction of the target as the indicator 312 can point to the location of the target 306 by determining the angle between the unit 310 and the target 306.

According to another aspect of the present invention, the tracking device can generate a signal containing GPS location and time and date information upon successful deployment of the embedder. Any suitable electronic transmission means may be used to transfer the data to the hand-held unit. This information can then be used to confirm that the hunter is complying with application date, time and geographic restrictions.

Turning now to FIGS. 7-10, it is seen that an alternative embodiment of the present invention is illustrated. The arrow 110 has a head 111 and a shaft 112. Intermediate the head 111 and shaft 112 is the tracking assembly 120. The tracking assembly 120 has ends 121 and 122, and comprises a body 130. The body 130 has a threaded receiver 131, a sidewall 135 with port 136, and ratchets 137 preferably located on the inside surface of the side wall.

A plunger 140 is housed within the body 130. The plunger 140 has a head 143 and a threaded shaft 144. A ridge 145 is on the outer side surface of the head 143, and can cooperate with the ratchets 137 on the body 130. The plunger 140, due to momentum, will move slightly towards the arrow end of the body 130 upon impact with the target, this will cause the ridge 145 to move against the ratchets 137 to lock the plunger in position relative the body. The plunger head forces an embedder 150 having an arcuate back 153, a hook 154 and a break point 155 out the port. In this regard, the plunger rides along the arcuate back 153 and causes the embedder 150 to pivot about a first of two ends. The hook 154 then engages a portion of the target, and as the arrow 10 passes through the target causes the embedder 150 to break at the break point 155 and remain lodged within the target.

Figure 11:
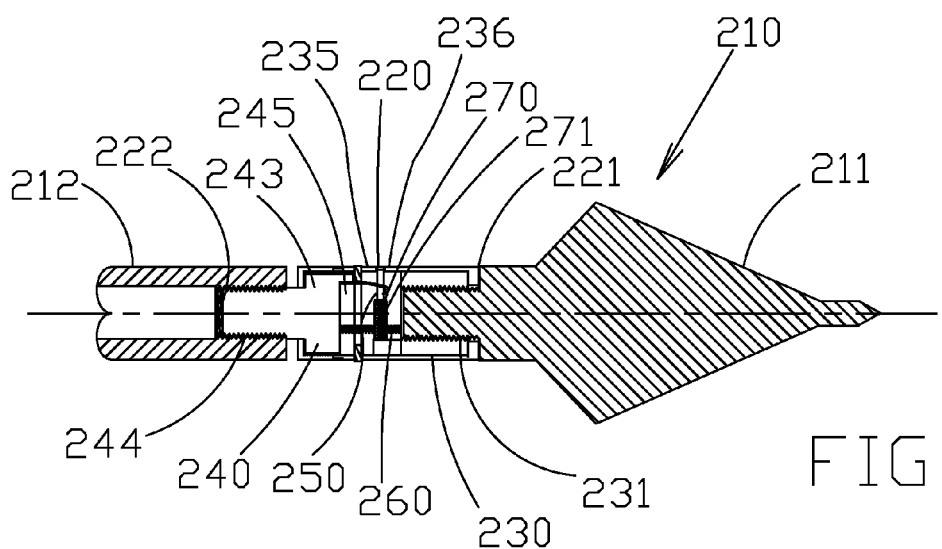
FIG. 11 is a cross-sectional view of an additional alternative embodiment of the present invention.
Figure 12:
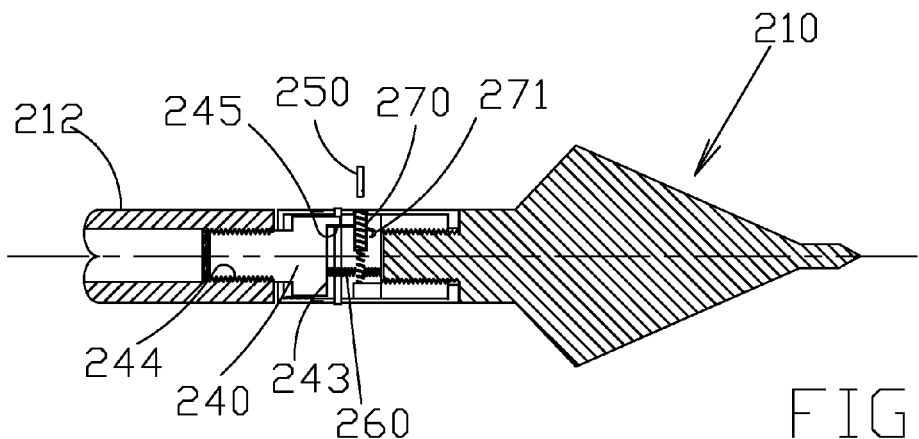
FIG. 12 is a cross-sectional view showing the embedder released from the body.

Turning now to FIGS. 11 and 12, it is seen that a third embodiment useful with an arrow 210 having a head 211 and a shaft 212 is illustrated. A tracking assembly 220 having ends 221 and 222 is provided. A body 230 having a threaded receiver 231 and a sidewall 235 with a port 236 is also provided.

A plunger 240 is housed within the body. The plunger 240 is biased with a spring 260 towards a first of two ends within the body. The plunger 240 has a head 243, a threaded shaft 244 for connecting to an arrow shaft, and a release 245 with a hook 246.

An embedder 250 is ejected through the port 236 of the body 230 when released by the release 245. The embedder is aided in ejection by spring 270. A cover 271 can be provided to prevent the hook 246 of the release 245 from engaging the spring 270 after the release.

The release 245 disengages from the embedder 250 upon impact of the arrow 210 with a target. This occurs as the plunger 240 overcomes spring force of spring 260 and moves towards the opposite end of the body.

It is appreciated that other embodiments can be provided to illustrate the broadest concepts of the present invention.

Thus it is apparent that there has been provided, in accordance with the invention, an arrow with embedded deployable RFID tag and the methods of using the same that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A trackable assembly used with an arrow, said trackable assembly comprising:
   a body, said body having a shaft and a sidewall with a port;
   a carriage, said carriage having a threaded hole and being movable relative said body;
   an embedder having an RFID tag, said embedder being deployable from said port;
   a release maintaining said embedder within said body and releasing said embedder from said body when said carriage moves relative said body, said embedder has a notch and said release has a hook, said hook engaging said notch to maintain said embedder within said body prior to impact of the arrow with a target; and
   a base spring, said base spring biasing said body and said carriage to a first position and biasing said hook to engage said notch when said carriage is in a first position.

2. The assembly of claim 1 wherein said release has a pivot, and said hook is on one side of said pivot and said base spring engages said release of the other side of said pivot of said release.

3. The assembly of claim 2 further comprising an embedder spring, said embedder spring forcing said embedder to exit via said port when the force of said base spring is overcome and said hook ceases to engage said notch.

4. A trackable assembly used with an arrow, said trackable assembly comprising:
   a body, said body having a shaft and a sidewall with a port;
   a carriage, said carriage having a threaded hole and being movable relative said body;
   an embedder having an RFID tag, said embedder being deployable from said port;
   a release maintaining said embedder within said body and releasing said embedder from said body when said carriage moves relative said body; and further comprising a safety, said safety preventing said body from moving relative said carriage.

5. The assembly of claim 4 wherein said safety has a perimeter and said safety is rotatable from a first locked position to a second unlocked position.

6. The assembly of claim 5 wherein said safety further comprises a lug, said lug directly preventing said release from ceasing engagement from said embedder when in the first locked position.

7. A method comprising the steps:
   providing an arrow with a head and a shaft, wherein the head and shaft are threadably disconnectable;
   providing a trackable assembly with a deployable embedder, the embedder having an RFID tag;
   connecting the trackable assembly between the head and the shaft forming a single structure, said connecting including threading the trackable assembly onto the shaft and threading the head onto the trackable assembly;
   providing a handheld device capable of tracking the RFID tag of the embedder;
   tracking the RFID tag via the handheld device; and
   Wherein the step of providing a trackable assembly further comprises the step of providing a safety whereby the user can practice without the embedder deploying from the trackable assembly.

8. The method of claim 7 wherein the handheld device is GPS enabled, and the step of providing a handheld device further comprises the step of providing a handheld device that can display the RFID location overlaid upon GPS information on a display.

* * * * *